3,538,028
VULCANIZATER OF COMPOSITIONS COMPRISING A FLUORINE-CONTAINING COPOLYMER AND SILICONE GUM

Coleman P. Morgan, Richboro, Pa., assignor to The Bendix Corporation, Sidney, N.Y., a corporation of Delaware
No Drawing. Continuation-in-part of application Ser. No. 313,448, Oct. 3, 1963. This application Oct. 22, 1964, Ser. No. 405,866
Int. Cl. C08f *37/02, 37/16, 45/08*
U.S. Cl. 260—23     7 Claims

ABSTRACT OF THE DISCLOSURE

Inserts, connectors, and grommets of high compression set resistance are made by combining a thermosetting copolymer of vinyl fluoride and hexafluoropropylene with a thermoplastic copolymer of the same ingredients in the presence of a silicone gum. They can be vulcanized.

---

This invention relates to synthetic rubber and a composition from which it is made; it also relates to a method of making the rubbery product.

This case is a continuation-in-part of my application Ser. No. 313,448, filed Oct. 3, 1963, now being abandoned.

There are many uses for resilient, rubbery compositions of either natural or synthetic resins which have good electrical insulating properties, but among the uses which require the highest qualities in the rubber are those in which the material is shaped to form and is used as grommets connector inserts, and connector parts for the ignition systems of aircraft and missile engines of jet and various other types. In such use the articles are subjected to continuous high temperature and abuse, affecting their electrical resistance, physical strength, compression set, resistance to disintegration under vibration, and ability to withstand changes of pressure at high temperature.

Among the plastics which have been proposed for these uses are the copolymers of vinylidene fluoride and hexafluoropropylene, but it has been difficult to obtain low temperature flexibility and high temperature physical resistance with them. Furthermore, the mixing and molding characteristics of these polymers were less than satisfactory and their shelf ageing was not all that could be desired. In molding the materials of the prior art by transfer and injection, the material did not flow as well as could be desired, the mold cavities filled slowly, there were imperfections in flow-knitting, pressures of 40–50 tons were required for molding, and the molding of grommet inserts and connectors required about 30 minutes. It was also desirable to improve their heat resistance, dielectric properties, and the insulation characteristics of these polymers. In general these fluorocarbons were difficult to handle, left something to be desired in their electrical properties, and their use in general high temperature electrical situations was sometimes not recommended.

It is among the object of the invention to provide compositions employing copolymers of vinylidene fluoride and hexafluoropropylene which have better molding characteristics, flow better, fill the mold cavities faster, flow-knit better, require molding pressures on the order of half those which were previously necessary, reduce molding times to about one quarter of their previous duration, and produce articles which have some superior physical and chemical characteristics. Among the improved properties are high temperature resistance and electrical resistivity at low and elevated temperature.

The objects of the invention are accomplished, generally speaking, by a vulcanizable composition having as its essential resinous ingredients a thermosetting copolymer of vinylidene fluoride and hexafluoropropylene, a fluid thermoplastic copolymer of vinylidene fluoride and hexafluoropropylene and a silicone gum.

A general formula for use in grommet and connector compositions from which articles resistant to high temperature and having excellent electrical properties is derived, is, in parts by weight, as follows:

| | Parts by wt. |
|---|---|
| Fluocarbon polymer | 85–97.5 |
| Silicone gum | 15–2.5 |
| Liquid fluorocarbon polymer | 15–4.0 |
| Extra light calcined magnesia | 12–25.0 |
| Filler | 7.5–30.0 |
| Thermal carbon black | 1.0–3.0 |
| Accelerators or crosslink agents | 1.0–4.0 |
| Silicone catalyst | 0–.22 |
| Internal lubricants | 0–6.00 |

The low molecular weight fluid copolymer contributes several functions and improvements and displaces less satisfactory materials: It plasticizes the thermosetting polymer, particularly at high temperature where the maintenance of plasticizing effect is most necessary; it is compatible with the silicone and the thermosetting polymer, and improves their compatibility; it is effective at elevated temperatures, being superior in this property to prior art plasticizers; and it contributes flexibility and ease to the mixing operation. It contributes to resistance to ageing, to chemical resistance, to resist oils, fuels and the various fluids encountered in motor work, and it has excellent and long lasting resistance to high temperature.

The thermosetting copolymers are of high molecular weight compared to the fluid copolymers and they preferably contain more than 60% by weight of fluorine. The liquid polymers are of relatively low molecular weight and are thermoplastic rather than thermosetting. A representative copolymer has a specific gravity about 1.72 at 86° F., cannot be cross-linked by standard accelerators or by the metallic oxides used in such compositions, and has a viscosity of about 88,000 cps. (Brookfield) at 110° F. and of 7500 cps. at 170° F. These copolymers are thus very fluid at elevated temperatures and adequately so at room temperatures.

The silicone gum employed may be of either standard or reinforced type, for instance standard types such as fluoro siloxane, methyl-phenyl siloxane and methyl-phenyl-vinyl siloxane. Among the reinforced types are methyl vinyl siloxane, the copolymer of dimethyl siloxane and trifluoropropylmethyl siloxane, and methyl-phenyl-vinyl polysiloxane. The reinforced type are preferred for both grommets and connectors.

Although the fillers, activators and vulcanizers of various types known to the prior art have been found useful in some degree, yet it has been discovered that, with these three basic ingredients, substantial advantages are obtained by the use of particular fillers, accelerators and activators. This can be perceived by a study of the following compositions, which are preferred, respectively, in grommet and connector insert manufacture.

PREFERRED COMPOSITIONS FOR—

| Ingredients | Parts by weight | |
|---|---|---|
| | Grommets | Connectors |
| Copolymer vinylidene fluoride and hexafluoropropylene | 90.00 | 95.00 |
| Methyl vinyl siloxane, reenforced gum | 10.00 | 5.00 |
| Liquid fluorocarbon | 12.00 | 4.00 |
| Extra light MgO | 15.00 | 20.00 |
| Calcium carbonate | 10.00 | 7.50 |
| Hydrated sodium silico aluminate | | 10.00 |
| Zirconium silicate | | 7.50 |
| Thermal black | 2.00 | 3.00 |
| N,N'-dicinnamylidene-1,6-hexanediamine | 2.50 | |
| Hexamethylene-diamine carbamate | | 1.50 |
| 2,4-dichloro benzoyl peroxide | .22 | |
| Zinc stearate | | 1.00 |
| Fluorinated ethylene propylene powder | | 4.00 |

The magnesia is a fine grade which acts both as a vulcanizer and as an acid acceptor. Most all grades of magnesium oxide of the type commercially called extra light are suitable. Such have particle sizes ranging from .05 to .15 micron, have a specific gravity about 3.49 and contain a minimum of 94% MgO; these qualities are to be sought if optimum physical and ageing characteristics are to be obtained.

The accelerators and cross-linking agents may be of the amine, blocked diamine and the diimine types, for example hexamethylene diamine carbamate, ethylenediamine carbamate and N,N'-dicinnamylidene-1,6-hexanediamine of which the latter is preferred in grommets and the first in connectors. The catalysts for the silicones are generally peroxides and they are generally useful in these formulas but 2,4-dichloro benzoyl peroxide is preferred in grommets. For other uses the standard benzoyl peroxide is satisfactory.

The fillers employed may be of the types commercially available for general rubber-compounding, including clay, silica, carbon black, calcium carbonate and calcium silicate. In grommets finely divided calcium carbonate is preferred, but in the connector compounds a combination of calcium carbonate, zirconium silicate and hydrated sodium silico aluminate has proved to be superior. The carbon black is normally used only where a dark colored product is desired. When it is used the type commercially called thermal is preferred. These fillers were found to provide the best balance of physical, electrical and chemical characteristics in grommets and connector inserts. The combination of fillers used in connectors provides the necessary electrical and physical properties and also the necessary hardness range. In grommets the hardness range is provided by calcium carbonate alone. The most desirable grades have a density of 27–29, specific gravity about 2.65 and particle size roughly approximately .03 micron.

Zirconium silicate aids processing and improves electrical characteristics in the harder type connectors. The material employed has a molecular weight of about 183.1 and a zircon content of 91.5–94%, a specific gravity of 4.5 and a density of 68 lbs./cu. ft. All the particles were of sizes measurable in microns.

Zinc stearate and fluorinated ethylene propylene polymer were included and contributed to the flexibility of the molding process without detracting from the qualities of the products. They also aided in obtaining a rapid and thorough blending of the polymers. The hydrated sodium silico aluminate is preferred over other aluminate fillers because it provides good physical properties, resistance to long exposure to heat and maintains the electrical characteristics. In its preferred form it has a particle size of 20–30 microns, a specific gravity of 2.1 and a pH of 9.5–10.5. In addition to the advantages already indicated, these compositions provide for easier separation of the molded product from the mold surface and enhance the resistance of the composition to fuels and lubricants used around power plants.

Heretofore it had been very difficult to blend a silicone gum with a fluorocarbon polymer but the present composition has improved mixing, molding, heat ageing and even better low temperature properties compared to prior fluorocarbon compositions.

In some prior art compositions it was necessary to employ a pretreatment of some of the ingredients, but this is unnecessary with the new compositions. The order of addition is straightforward. The thermo-hardening copolymer, being worked up first on the roll mill, the magnesium oxide and fluorinated ethylene propylene are incorporated, followed by the fillers and the internal lubricant; the fluorocarbon, the siloxane resin and the accelerator are incorporated last. This order of compounding is not essential but it is productive of good results and may be followed.

Molding may be satisfactorily practiced by transfer or by compression. The material is preformed so as to be placed in a transfer pot, and is ejected from the pot through an orifice to the mold cavity. While the material is in the cavity, and pressure is supplied by a press at constant intensity, the preliminary cure begins, a reaction which depends upon heat and time. Temperatures from 290°–330° F. are useful with cure times not generally exceeding 30 minutes. The cure is not complete but the pieces are transferred to a vulcanizing chamber after the partially vulcanized part has been removed from the mold cavity. The initial step of curing the mold is called the pre-cure and that in the oven is called post-cure. The post-cure times and temperatures vary with the thickness of the part and with properties which are to be achieved. In making grommets and connector inserts the oven schedule may be:

| Hours: | ° F. |
|---|---|
| 1 | 200 |
| 1 | 250 |
| 1 | 300 |
| 1 | 350 |
| 1 | 400 |
| 16 | 450 |

The parts are then considered to be fully vulcanized and ready for inspection.

The example of the process which has just been given is exemplary and representative of the best average working conditions in the manufacture of grommets and connectors, which constitute, in many instances, substantial blocks of material into which heat penetrates slowly. In making thin bodies, such as sheet and tubing, the vulcanizing can be completed much more rapidly.

These new grommets and connector inserts are superior to what was previously employed in that their general resistance to deterioration of physical and chemical properties by heat, severe conditions of use, and contact with degrading fluids such as fuels and oils is improved. They have particularly better molding characteristics than prior thermoplastics of this fluorocarbon type, being moldable with greatly reduced pressure in much shorter time.

Although only a limited number of embodiments of the invention have been described in the foregoing specification, it is to be expressly understood that various changes may be made therein without departing from the spirit and scope of the invention as will now be apparent to those skilled in the art.

What is claimed is:

1. A vulcanizable composition having as its essential ingredients in parts by weight a thermosetting copolymer of
   vinylidene fluoride and hexafluoropropylene: 85–97.5
   a thermoplastic, low molecular weight, fluid copolymer of vinylidene fluoride and hexafluoropropylene: 15–4.0
   silicone gum: 15–2.5
   filler: 7.5–33
   activators: 1–5.0 internal lubricants: 0–6.0
vulcanizer: 12–25
colorant: 0–3 in which the thermosetting copolymer contains at least 60% by weight of fluorine and the fluid copolymer is inert to the standard cross-linking agents, and has a viscosity of about 88,000 cps. at 100° F. and of about 7500 cps. at 170° F.

2. The composition of claim 1 in which the vulcanizer is MgO.

3. The composition of claim 1 in which the fillers are hydrated sodium silico aluminate and zirconium silicate.

4. The composition of claim 1 in which the activators include 2,4-dichlorobenzoyl peroxide, N,N'-dicinnamylidene 1,6-hexanediamine, and hexamethylene-diamine carbamate.

5. A resilient, high-temperature resistant, grommet being the vulcanized product of the following ingredients in parts by weight:
  a thermosetting higher molecular weight copolymer of vinylidene fluoride and hexafluoropropylene containing at least 60% by weight of fluorine about 90 pts.
  methyl vinyl siloxane gum about 10 pts.
  a thermoplastic lower molecular weight copolymer of vinylidene fluoride and hexafluoropropylene being inert to the standard cross-linking agents, and having a viscosity of about 88,000 cps. at 100° F. and of about 7500 cps. at 170° F. about 12 pts.
  MgO about 15 pts.
  CaCO$_3$ about 10 pts.
  carbon black about 2 pts.
  activators:
    N,N'-dicinnamylidene - 1,6 - hexanediamine about 2.5 pts.
    2,4-dichlorobenzoyl peroxide about .22 pts.
  internal lubricant 0–6%.

6. A resilient, high-temperature resistant, connector insert being the vulcanized product of the following ingredients in proportions by weight:
  a thermosetting copolymer of vinylidene fluoride and hexafluoropropylene, containing at least 60% by weight of fluorine about 95
  methyl vinyl siloxane about 5
  liquid thermoplastic copolymer of vinylidene fluorine and hexafluoropropylene and being inert to standard cross-linking agents, and having a viscosity of about 88,000 cps. at 100° F., and of about 7500 cps. at 170° F. about 4
  MgO about 20
  CaCO$_3$ about 7.5
  hydrated sodium silico aluminate about 10.0
  zirconium silicate about 7.5
  carbon black about 3.0
  hexamethylene diamine carbamate about 1.5
  internal lubricant including
    zinc stearate about 5.0.

7. A resilient, high temperature resistant, rubbery article being the vulcanized product of the following ingredients in parts by weight:
  a thermosetting copolymer of vinylidene fluoride and hexafluoropropylene, containing at least 60% by weight of fluorine, 90–95 pts.
  a thermoplastic copolymer of vinylidene fluoride and hexafluoropropylene of lower molecular weight than above, and being inert to standard cross-linking agents, and having a viscosity of about 88,000 cps. at 100° F., and of about 7500 cps. at 170° F., 4–12 pts.
  silicone gum 5–10 pts.
  MgO 15–20 pts.
  filler 7.5–33 pts.
  activators 1–4.5 pts.
  colorant 0–4 pts.
  internal lubricant 0–6%.

References Cited

UNITED STATES PATENTS

| | | | |
|---|---|---|---|
| 2,275,957 | 3/1942 | Groff | 260—23 |
| 2,456,265 | 12/1948 | Frolich | 260—23 |
| 2,462,331 | 2/1949 | Myers | 260—23 |
| 2,489,704 | 11/1949 | Davis | 260—23.7 |
| 3,324,060 | 6/1967 | Scopp et al. | 260—23 |
| 3,415,900 | 12/1968 | Robb | 260—827 |

OTHER REFERENCES

Montermoso, "Rubber Chemistry and Technology," vol. 34, July to December 1961, pp. 1532–1537, TS 1870 R 75.

Compounding Ingredients for Rubber, 1961, p. 345, TS 1890 I 53 C 2.

Report No. 58–3, 1958, p. 6.
Viton Bulletin No. 2, 1960, p. 3.
Viton Bulletin No. 3, 1960, p. 1.
Viton Bulletin No. 9, 1963, p. 17.

DONALD E. CZAJA, Primary Examiner

R. A. WHITE, Assistant Examiner

U.S. Cl. X.R.

260—18, 33.8, 37, 41, 827